UNITED STATES PATENT OFFICE.

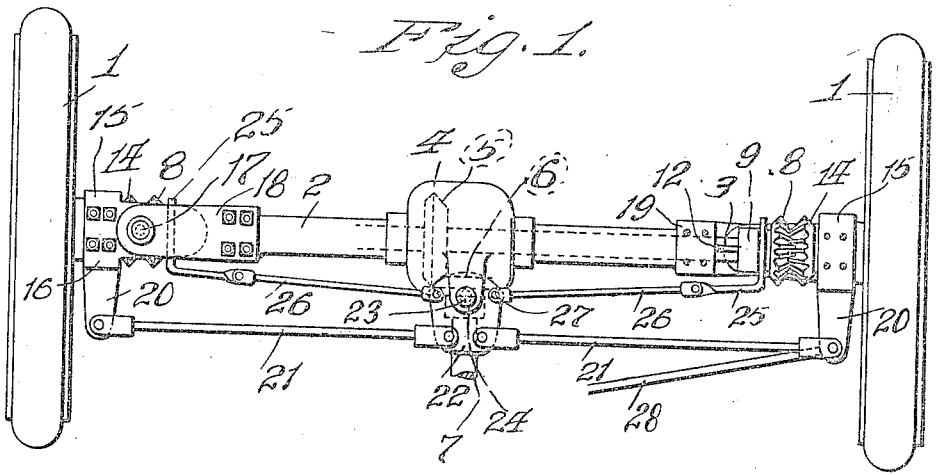
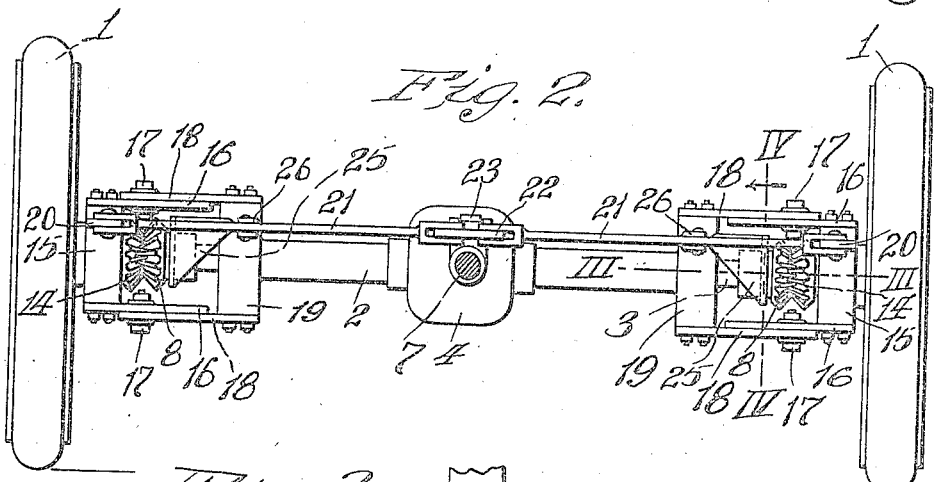
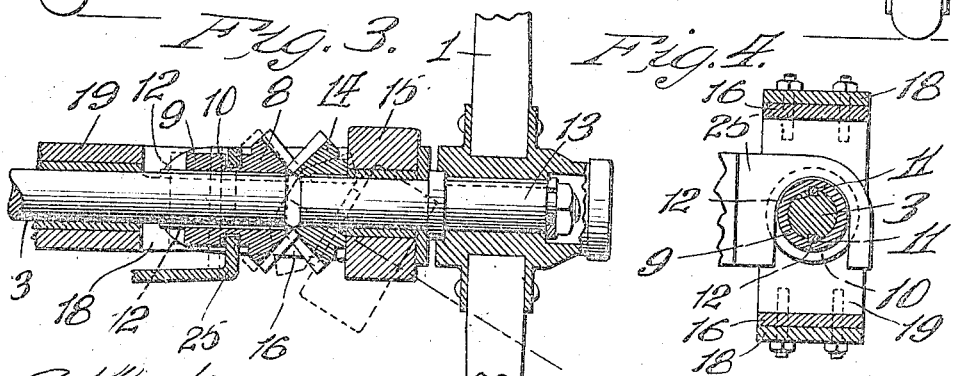

GEORGE WEINREICH, OF THE COUNTY OF ST. LOUIS, MISSOURI.

DRIVING AND STEERING GEAR FOR SELF-PROPELLED VEHICLES.

1,248,224.

Specification of Letters Patent.

Patented Nov. 27, 1917.

Application filed July 16, 1915. Serial No. 40,150.

*To all whom it may concern:*

Be it known that I, GEORGE WEINREICH, a citizen of the United States of America, and a resident of the county of St. Louis and State of Missouri, have invented certain new and useful Improvements in Driving and Steering Gear for Self-Propelled Vehicles, of which the following is a specification.

The primary object of this invention is to provide an improved driving and guiding mechanism for the steering wheels of power driven vehicles.

Another object is to provide the front axle with a revolubly mounted driving shaft, said shaft being in horizontal alinement with the spindle of the steering wheels.

A further object is to provide the steering wheel with a bevel gear, said bevel gear being in mesh with a mating gear that is carried by a driving shaft, said gears forming a clutch when the wheel and shaft are in alinement, said gears being adapted to mesh like ordinary bevel gears when the wheel is turned out of alinement with the shaft.

Other and further objects will appear in the specification, and be specifically pointed out in the appended claims, reference being had to the accompanying drawings exemplifying the invention, and in which, Figure 1 is a plan view of the front axle of an automobile, showing this improved device applied thereto.

Fig. 2 is an end elevation of Fig. 1, parts being shown in section.

Fig. 3 is an enlarged fragmentary section taken on the line III—III, Fig. 2.

Fig. 4 is an enlarged section on the line IV—IV, Fig. 2.

Referring to the drawings: 1 designates the steering wheels of a power driven vehicle, which are operatably mounted to a housing 2. Inclosed in said housing is a horizontally arranged driving shaft 3. Centrally arranged on said housing is a gear casing 4, said casing inclosing a bevel gear 5, which is mounted on the shaft 3, and a mating gear 6, which is carried by the driving shaft 7. Slidably mounted on each end of the driving shaft 3 is a bevel gear 8, each gear having a hub 9. Formed in each of said hubs is a groove 10. Formed in each of the hubs 9 of each gear 8 is a pair of opposing recesses 11, each of said recesses being mounted over keys 12 which are secured to the driving shaft 3.

Securely mounted in each of the wheels 1 is a spindle 13. Securely mounted to the inner ends of each of said spindles is a bevel gear 14. Each of said bevel gears 14 meshes with each of said bevel gears 8. Each spindle 13 is turnably mounted in a bearing 15. Secured to the top and bottom of each bearing 15 are a pair of plates 16, each of said pair of plates forming a yoke. Each plate 16 is pivoted at 17 to a plate 18, said plates 18 being securely mounted in pairs to enlarged portions 19 that are formed on each end of the housing 2, each pair of plates 18 forming a yoke.

Extending rearwardly from each of the bearings 15 is a finger 20. Pivotally mounted to each of said fingers is a steering rod 21. Each of said rods has its inner end pivoted to a turnably mounted plate 22. Said plate is pivotally secured at 23 to a pair of brackets 24, said brackets extending rearwardly from the gear casing 4.

Mounted in each of the grooves 10 of the gears 8 is a shifting member 25. Each of said members has a shifting rod 26 secured thereto, the inner ends of said rods being pivotally mounted at 27 to the plate 22.

In the operation of this improved device, when the vehicle is following a straight path, the spindles 13 of the wheels 1 and driving shaft 3 will be in alinement, the adjacent ends of the teeth of each pair of bevel gears 8 and 14 meshing with each other forming clutches. Said gears are held in their engaging positions by the members 25, and therefore cannot be forced out of engagement from one another.

When it is desired to turn the wheels 1 from the straight path which they have been following, the rod 28, which leads from the steering wheel (not shown), is manipulated, and the wheels are turned. In order to turn said wheels, the rods 21 were shifted, thereby moving the plate 22. This moving of the plate 22 will exert a pull on the rods 26, thereby causing the members 25 to shift the gears 8 inwardly on the shaft 3. These gears are moved inwardly just enough to prevent the crowding and binding of the teeth of the gears 14, which are carried by the spindles 13, against the teeth of the gears 8, relative to the angle at which the gears 14 are moved, and at the same time keeping the sets of gears 8 and 14 properly in mesh with each other.

When the steering wheels 1 are moved back into their former positions, the gears 8 will be moved outwardly on the driving shaft 3 by the manipulations of the rods 26 and shifting members a corresponding distance so that the teeth of the gears 8 will be in proper mesh with the gears 14 when said gears 14 are moved into an alining position with the shaft 3.

With this improved construction applied to the front axle of vehicles, a lesser number of gears are used than heretofore; and this device will be inexpensive of construction on account of its simplicity.

What I claim is:

1. A driving and guiding mechanism for a vehicle, comprising a support, a shaft revolubly mounted in said support, a bevel gear slidably secured adjacent each end of said shaft, a pivotally mounted steering wheel spindle located adjacent each end of said shaft, a wheel mounted on each of said spindles, a bevel gear secured to each of said spindles, said gears of said shaft being in mesh with said gears of said spindles, said shafts, spindles and gears adapted to aline with each other, a shifting member in engagement with each of said slidably mounted gears, a shifting rod connected to each of said members, a plate pivotally mounted to said support and connected to said shifting rods, a shifting finger operably related to each of said spindles, and a pair of steering rods pivotally secured to said plate and to said fingers, said steering rods being connected to said plate in oppositely disposed positions relative to said shifting rods.

2. In a vehicle, a support, a shaft revolubly mounted in said support, a bevel gear slidably secured adjacent each end of said shaft, a shifting mechanism comprising a pivotally mounted plate and a pair of shifting rods connected to said plate, said shifting rods being connected to said gears, a steering and driving wheel located adjacent each end of said shaft, a bevel gear secured to each of said wheels, a steering mechanism operatably related to said plate, said gears of said shaft being in mesh with said gears of said wheels, said shaft, wheels and gears adapted to aline with each other, said slidably mounted gears adapted to be moved longitudinally of said shaft by said shifting mechanism when said wheels are moved out of alinement with said shaft by said steering mechanism.

3. A driving and guiding mechanism for a vehicle, comprising a support, a shaft revolubly mounted in said support, a bevel gear slidably secured adjacent each end of said shaft, a pivotally mounted steering wheel spindle located adjacent each end of said shaft, a wheel mounted on each of said spindles, a bevel gear secured to each of said spindles, said gears of said shaft being in mesh with said gears of said spindles, said shafts, spindles and gears adapted to aline with each other, a shifting member in engagement with each of said slidably mounted gears, a shifting rod connected to each of said members, a plate pivotally mounted to said support and connected to said shifting rods, a shifting finger operably related to each of said spindles, and a pair of steering rods pivotally secured to said plate and to said fingers.

GEORGE WEINREICH.

In the presence of—
H. G. FLETCHER,
M. C. HAMMON.